2,781,313

DRILLING MUD COMPOSITIONS

Richard A. Salathiel, Houston, Tex., assignor, by mesne assignments, to Esso Research and Engineering Company, Elizabeth, N. J., a corporation of Delaware No Drawing. Application September 14, 1955, Serial No. 534,380

18 Claims. (Cl. 252—8.5)

The present invention is directed to a suspension of finely divided solids in an aqueous medium for use in well drilling operations. More particularly, the invention is directed to a drilling mud having a low filtration rate. In its more specific aspects, the invention is directed to a drilling mud to which has been added materials for reducing filtration rate.

The present invention may be briefly described as involving a drilling mud comprising at least 5% by weight of finely divided solids in an aqueous saline medium to which has been added about 1 to 15 pounds of starch per 42 gallon barrel of mud and about 0.1 to 10 pounds per 42 gallon barrel of mud of an additive taken from the group consisting of water soluble alkali metal sulfides, polysulfides and hydrosulfites.

In the rotary method of drilling boreholes, a flowable aqueous suspension of finely divided solids, commonly referred to as a drilling mud, is pumped down the drill stem through the openings in the drill bit and upwardly through the annular space between the drill stem and the wall of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficultly permeable coating or filter cake on the walls of the borehole for the purpose of reducing loss of water from the borehole to the formation and thereby reducing softening of the borehole walls and caving into the drill hole. It is preferable that the filter cake formed on the walls of the borehole be thin rather than thick so as to avoid mechanical difficulties in moving the bit in and out of the hole and in placing casing in the hole.

The aqueous suspensions of finely divided solids employed as drilling fluids in rotary drilling operations are sometimes prepared by admixing suitable amounts of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells may be obtained by forming a suspension in water of surface clay at or adjacent the well site or may be prepared in the process of drilling by dispersing in water the cuttings produced from the borehole. Weighting materials, clays, and chemicals may, of course, be added to the drilling fluid prepared in the last mentioned manner.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which have a relatively low filtration rate may be prepared from borehole cuttings; however, it has generally been found necessary to incorporate filtration reducing agents into the mud to impart this desirable property thereto. It is common practice to employ starches for this purpose and, while the addition of starch has proved beneficial, there has been much to be desired in the way of performance, particularly with respect to the reduction of filtration rate when the aqueous medium is an aqueous saline medium.

It is, therefore, an object of the present invention to provide a dispersion or suspension of finely divided solid material in an aqueous saline medium having little tendency to lose water by filtration therefrom. Another object of the present invention is to provide a drilling fluid suitable for use in the rotary drilling of boreholes into subsurface formations and having a low filtration rate. Another object of the present invention is to provide an agent which, on addition to the aqueous, saline drilling fluid used in the drilling of boreholes into subsurface formations, will substantially reduce the loss of water therefrom by filtration. A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The present invention may be described as relating to a drilling mud composition, a method of preparing such drilling mud composition and a well drilling process employing the drilling mud composition of the present invention.

The composition of the present invention comprises an aqueous saline vehicle having dispersed or suspended therein at least 5% by weight of a finely divided solid material and to which has been incorporated starch and an additive taken from the group consisting of water soluble alkali metal sulfides, polysulfides, and hydrosulfites; the starch and additive being incorporated in amounts sufficient to substantially reduce the tendency of the composition to lose water by filtration. In accordance with a modified form of the invention the composition also contains an alkali metal hydroxide such as sodium hydroxide, potassium hydroxide, etc. in an amount sufficient to still further reduce the tendency of drilling muds to lose water by filtration (e. g., about 0.1 to 5 pounds of alkali metal hydroxide per 42 gallon barrel of mud).

The finely divided solid material of the composition of my invention may, of course, be any finely divided solid which is capable of being dispersed or suspended in an aqueous liquid drilling fluid used in rotary drilling of boreholes. The finely divided solid material employed in the practice of the present invention will ordinarily include clay, such as colloidal clay bodies. For example, I may use in my drilling mud or aqueous suspension, colloidal clays, such as Wyoming bentonite, El Paso surface clay, medium yield drilling clays from Texas, clays containing suitable cationic combinations of the montmorillonites may be used. Sodium montmorillonite such as that encountered in Wyoming bentonite is included in the preferred type of clay. I also contemplate that I may use in the practice of my invention muds such as those produced when clayey subsurface formations are drilled. For example, mud such as that obtained from a drilling well in Lake Raccourci in Louisiana may be found entirely suitable. Likewise, I may employ in my invention dried ground shale such as has been obtained from a well in West Cote Blanche Bay in southern Louisiana. In addition, the solids portion of the drilling mud may contain ingredients of the type well known in the art such as dispersants, pH control agents, etc., including materials such as water soluble carbonates, phosphates, borates, etc. Weighting agents such as barytes, iron oxide, barium sulfate, calcium carbonate, silica, etc. may also be employed. The amount of solids (including clay) to be used may range from about 5% by weight of the mud up to, for example, as high as about 75% by weight when it is desirable to employ comparatively large amounts of a weighting agent.

As has been indicated, there is also incorporated into the drilling mud an amount of starch and water soluble alkali metal sulfide, polysulfide, or hydrosulfite sufficient to substantially reduce the tendency of the drilling mud to lose water by filtration. Among the additives that may be used alone or in admixture are sodium sulfide, potassium sulfide, sodium and potassium disulfide, trisulfide, tetrasulfide, etc., sodium hydrosulfite, potassium hydrosulfite, etc. and mixtures thereof.

Generally speaking, satisfactory results are obtained through the use of about 1 to 15 pounds of starch and about 0.1 to 10 pounds of the alkali metal sulfide, polysulfide or hydrosulfite additive per 42 gallon barrel of mud. It is to be understood, of course, that the amount of starch and the amount of said additive required to give the desired reduction in filtration loss from a suspension of finely divided solids in an aqueous saline liquid vehicle will vary with circumstances over a comparatively wide range, in that the amounts of starch and alkali metal sulfide, polysulfide or hydrosulfite to be employed in a specific suspension or dispersion will depend upon the characteristics of the material to be treated and the circumstances under which it is employed.

The starch and additive (i. e., alkali metal sulfide, polysulfide or hydrosulfite) may be incorporated into the drilling mud in any of the suitable manners known to those skilled in the art. As a specific example of the practice of the present invention it may be desirable to employ aqueous solutions of starch and the additive. The solutions may then be incorporated with the aqueous dispersion or suspension of the finely divided solids. If desired, the starch, or additive, or both, may be directly incorporated in undiluted form in any suitable manner. In some situations the starch may be "digested" prior to use in order to improve the solubility characteristics thereof.

When it is desired to reduce the filtration rate of the drilling mud, the materials aforementioned or solutions thereof may be incorporated into the mud at any suitable point in the mud circulation system such as in the mud pit. In some situations it may be desirable to use a mixing device such as a cone and jet mixer or the equivalent thereof for incorporating the starch and additive into the drilling mud.

The present invention may also be considered in connection with the following examples which are given by way of illustration and which are not intended as limitations on the scope of this invention.

EXAMPLE 1

The water soluble alkali metal sulfide, polysulfide or hydrosulfite additives of the present invention may actually have a detrimental effect upon saline drilling muds if added in the absence of starch. This is shown by the following experiment wherein a drilling mud was prepared using, as the finely divided solids, a commercial clay comprising a blend of crude native Texas bentonite (crude calcium montmorillonite) with Wyoming bentonite (sodium montmorillonite). The drilling mud consisted of about 23 weight percent of the commercial clay dispersed in about 77 weight percent of an aqueous saline vehicle, such vehicle containing about 5 weight percent of dissolved salt. A sample of the thus prepared drilling mud was tested for viscosity, initial gel strength and filtration rate. Various amounts of sodium sulfide were added to other portions of the drilling mud and the thus prepared samples were likewise tested for viscosity, initial gel strength and filtration rate. The compositions prepared and results obtained are set forth in Table I.

Table I

EFFECTS OBTAINED BY ADDING SODIUM SULFIDE TO A STARCH-FREE SALINE DRILLING MUD

| Run No. | Amount of added sodium sulfide, lb./bbl. | Viscosity at 600 R. P. M., Stormer, cps. | Initial gel strength, grams, Stormer | Filtration rate, cc. in 30 minutes, A. P. I. |
| --- | --- | --- | --- | --- |
| 1 | 0 | 24 | 33 | 31 |
| 2 | 0.12 | 26 | 40 | 32 |
| 3 | 0.25 | 29 | 45 | 36 |
| 4 | 0.5 | 33 | 53 | 38 |
| 5 | 1.0 | 36 | 60 | 43 |
| 6 | 2.0 | 41 | 63 | 51 |

From Table I it will be noted that there was a progressive increase in filtration rate as progressively larger amounts of sodium sulfide were added; thus showing that the properties of the drilling mud were adversely affected through the addition of sodium sulfide.

EXAMPLE 2

When the alkali metal sulfides, polysulfides and hydrosulfites are incorporated into starch-containing drilling muds, a substantial reduction in filtration rate is obtained. However, closely related compounds do not give the beneficial effects obtainable with the alkali metal sulfides, polysulfides and hydrosulfites of the present invention. This is shown by the results obtained by the following example:

A drilling mud base was prepared consisting of about 20 weight percent of the commercial clay of Example 1 and about 80 weight percent of an aqueous saline vehicle, such vehicle containing about 5 weight percent of dissolved salt. There was added about 1 weight percent of starch and about 0.5 weight percent of sodium carbonate. Portions of the thus prepared drilling mud were modified through the addition of sodium sulfide, sodium tetrasulfide, sodium hydrosulfite, ammonium thiocyanate, and sodium thiosulfate. The modified and unmodified portions of the drilling mud were tested for viscosity, initial gel strength and filtration rate. The compositions prepared and results obtained are set forth in Table II.

Table II
PHYSICAL PROPERTIES OF UNMODIFIED AND MODIFIED STARCH-CONTAINING SALINE DRILLING MUDS

| Run No. | Materials added | Amount Added lb./bbl. | Viscosity at 600 R. P. M. Stormer, cps. | Initial gel strength, grams, Stormer | Filtration rate, cc. in 30 minutes, A. P. I. |
|---|---|---|---|---|---|
| 7 | None | | 46 | 33 | 47.2 |
| 8 | Sodium sulfide | 0.19 | 50 | 47 | 26.6 |
| 9 | do | 0.38 | 60 | 67 | 15.0 |
| 10 | Sodium tetrasulfide (Na$_2$S$_4$) | 0.3 | 48 | 38 | 34.6 |
| 11 | do | 0.6 | 53 | 54 | 19.4 |
| 12 | Sodium hydrosulfite (Na$_2$S$_2$O$_4$) | 1 | 50 | 34 | 14.8 |
| 13 | Ammonium thiocyanate | 1 | 45 | 32 | 50.8 |
| 14 | Sodium thiosulfate (Na$_2$S$_2$O$_3$.5H$_2$O) | 1 | 47 | 32 | 47.4 |

From Table II it will be noted that a substantial reduction in filtration rate was obtainable through the addition of the sodium sulfide, sodium tetrasulfide and sodium hydrosulfite. The potassium sulfides, polysulfides and hydrosulfites are equally as effective. It will be noted that ammonium thiocyanate and the sodium thiosulfate were ineffective.

EXAMPLE 3

As another example of the beneficial results obtainable in accordance with the present invention, a drilling mud was prepared consisting of about 22 weight percent of the commercial clay of Example 1 dispersed in about 78 weight percent of aqueous saline vehicle, such vehicle containing about 5 weight percent of dissolved salt. About 1 weight percent of starch and about 0.5 weight percent of sodium carbonate were added to the thus prepared drilling mud. A portion of the thus modified drilling mud was tested for viscosity, initial gel strength and filtration rate without modification and, in addition, other portions of the drilling mud were similarly tested after the addition of various amounts of sodium sulfide. The compositions prepared and the results obtained are set forth in Table III.

Table III
BENEFICIAL EFFECTS OBTAINABLE BY ADDING SODIUM SULFIDE TO A STARCH-CONTAINING SALINE DRILLING MUD (5% SALT SOLUTION)

| Run No. | Amount of added sodium sulfide, lb./bbl. | Viscosity at 600 R. P. M., Stormer, cps. | Initial gel strength, grams, Stormer | Filtration rate, cc. in 30 minutes, A. P. I. |
|---|---|---|---|---|
| 15 | 0 | 30 | 22 | 37 |
| 16 | 0.05 | 33 | 24 | 32 |
| 17 | 0.1 | 33 | 26 | 28 |
| 18 | 0.15 | 36 | 34 | 21 |
| 19 | 0.3 | 48 | 50 | 15 |
| 20 | 0.6 | 48 | 54 | 16 |
| 21 | 1.2 | 62 | 74 | 17 |
| 22 | 2.45 | 66 | 80 | 18 |

From Table III it is seen that there was a substantial reduction in filtration rate when the starch-containing drilling mud was modified through the addition of sodium sulfide. Equally satisfactory results are obtained when potassium sulfide is substituted for the sodium sulfide and the example is otherwise repeated.

EXAMPLE 4

As a still further example, a drilling mud base was prepared consisting of about 25 weight percent of the commercial clay of Example 1 and about 75 weight percent of an aqueous saline vehicle, such vehicle containing about 10 weight percent of salt. There was added about 1.0 weight percent of starch and about 0.5 weight percent of sodium carbonate. A portion of the thus prepared drilling mud was tested for viscosity, initial gel strength and filtration rate without modification and other portions of the drilling mud were similarly tested after modification with various amounts of sodium sulfide. The compositions prepared and results obtained are set forth in Table IV.

Table IV
BENEFICIAL EFFECTS OBTAINABLE BY ADDING SODIUM SULFIDE TO A STARCH-CONTAINING SALINE DRILLING MUD (10% SALT SOLUTION)

| Run No. | Amount of added sodium sulfide, lb./bbl. | Viscosity at 600 R. P. M., Stormer, cps. | Initial gel strength, grams, Stormer | Filtration rate, cc. in 30 minutes, A. P. I. |
|---|---|---|---|---|
| 23 | 0 | 36 | 20 | 90 |
| 24 | 0.1 | 43 | 30 | 64 |
| 25 | 0.2 | 85 | 60 | 36 |
| 26 | 0.4 | 103 | 72 | 28 |
| 27 | 0.85 | 70 | 61 | 32 |
| 28 | 1.65 | 45 | 33 | 46 |

It is to be noted from Table IV that in this instance there was also a substantial reduction in filtration rate through the addition of the sodium sulfide.

EXAMPLE 5

As a still further example, a drilling mud was prepared consisting of about 20 weight percent of the commercial clay of Example 1, and about 80 weight percent of an aqueous saline vehicle, such vehicle containing about 25 weight percent of dissolved salt. In addition, there was also incorporated into the drilling mud in this instance about 0.75 weight percent of starch and about 0.5 weight percent of sodium carbonate (a dispersant). Portions of the thus prepared drilling mud were modified through the addition thereto of various amounts of sodium sulfide and the unmodified and thus modified drilling muds were tested for viscosity, initial gel strength and filtration rate. The compositions prepared and the results obtained are set forth in Table V.

BENEFICIAL EFFECTS OBTAINABLE BY ADDING SODIUM SULFIDE TO A STARCH-CONTAINING SALINE DRILLING MUD (25% SALT SOLUTION)

| Run No. | Amount of added sodium sulfide, lb./bbl. | Viscosity at 600 R. P. M., Stormer, cps. | Initial gel strength, grams, Stormer | Filtration rate, cc. in 30 minutes, A. P. I. |
|---|---|---|---|---|
| 29 | 0 | 42 | 17 | 130 |
| 30 | 0.25 | 40 | 14 | 127 |
| 31 | 0.5 | 37 | 12 | 112 |
| 32 | 1.0 | 35 | 13 | 88 |
| 33 | 2.0 | 43 | 26 | 58 |

From Table V it will be noted that the filtration rate of the drilling mud was progressively improved as increasing amounts of sodium sulfide were added. Equally satisfactory results are obtainable with potassium sulfide.

An example of the beneficial results obtainable through the use of an alkali metal hydrosulfite such as sodium hydrosulfite is shown by the following example.

EXAMPLE 6

A drilling mud base was prepared consisting of about 20 weight percent of the commercial clay of Example 1 and about 80 weight percent of an aqueous saline vehicle, such vehicle containing about 5 weight percent of dissolved salt. There was also added about 1 weight percent of starch and about 0.5 weight perecnt of sodium carbonate. An unmodified portion of the thus prepared drilling mud and portions modified through the addition of various amounts of sodium hydrosulfite were tested for viscosity, initial gel strength and filtration rate. The compositions prepared and the results obtained are set forth in Table VI.

BENEFICIAL EFFECTS OBTAINABLE THROUGH THE ADDITION OF SODIUM HYDROSULFITE TO STARCH-CONTAINING SALINE DRILLING MUDS

| Run No. | Amount of added sodium hydrosulfite, lb./bbl. | Viscosity at 600 R. P. M., Stormer, cps. | Initial gel strength, grams, Stormer | Filtration rate, cc. in 30 minutes, A. P. I. |
| --- | --- | --- | --- | --- |
| 34 | 0 | 41 | 35 | 47.6 |
| 35 | 0.10 | 40 | 32 | 42.6 |
| 36 | 0.30 | 38 | 30 | 35.0 |
| 37 | 0.50 | 40 | 34 | 22.0 |
| 38 | 0.70 | 42 | 41 | 16.2 |
| 39 | 1.00 | 42 | 46 | 11.4 |
| 40 | 2.00 | 47 | 54 | 8.0 |
| 41 | 4.00 | 46 | 50 | 12.0 |

From Table VI it will be noted that a substantial reduction in filtration rate was obtained through the addition of the sodium hydrosulfite. With reference to compositions 32 to 38 it will be noted that the greatest improvement was obtained in the case of composition 37 wherein about 2 pounds of sodium hydrosulfite per barrel of drilling mud was employed. Equally satisfactory results are obtained through the use of potassium hydrosulfite.

In accordance with a modified form of the present invention a still further improvement in filtration rate is obtained by adding about 0.5 to 5 pounds of an alkali metal hydroxide per barrel of drilling mud. This is shown by the following example.

EXAMPLE 7

A drilling mud base was prepared consisting of about 20 weight percent of the commercial clay of Example 1 and about 80 weight percent of an aqueous vehicle, such vehicle containing about 5% of dissolved salt. There was also added about 0.5 pounds per barrel of sodium hydrosulfite, about 1 weight percent of starch and about 0.5 weight percent of sodium carbonate. An unmodified portion of the thus prepared drilling mud and portions modified through the addition of various amounts of sodium hydroxide were tested for viscosity, initial gel strength and filtration rate. The compositions prepared and the results obtained are set forth in Table VII.

BENEFITS OBTAINABLE THROUGH THE ADDITION OF SODIUM HYDROSULFITE AND SODIUM HYDROXIDE TO STARCH-CONTAINING SALINE DRILLING MUDS

| Run No. | Amount of added Sodium hydrosulfite, lb./bbl. | Amount of added sodium hydroxide, lb./bbl. | Mud properties | | |
| --- | --- | --- | --- | --- | --- |
| | | | Viscosity at 600 R. P. M. Stormer, cps. | Initial gel strength, grams, Stormer | Filtration rate, cc. in 30 min., A. P. I. |
| 42 | 0.50 | 0 | 40 | 34 | 22.0 |
| 43 | 0.50 | 0.25 | 42 | 42 | 21.4 |
| 44 | 0.50 | 0.5 | 48 | 55 | 20.4 |
| 45 | 0.50 | 1.0 | 48 | 57 | 17.2 |
| 46 | 0.50 | 2.0 | 40 | 41 | 13.3 |

From Table VII it will be seen that the addition of sodium hydroxide to the hydrosulfite-containing drilling mud resulted in a still further reduction in filtration rate.

What is claimed is:

1. A drilling mud comprising at least 5% by weight of finely divided solids in an aqueous saline medium to which has been added from about 1 to 15 pounds of starch per 42 gallon barrel of mud and from about 0.1 to 10 pounds per 42 gallon barrel of mud of an additive selected from the group consisting of water soluble alkali metal sulfides, polysulfides, and hydrosulfites, said starch and said additive being added in amounts sufficient to materially reduce the tendency of the drilling mud to lose water by filtration.

2. A drilling mud as in claim 1 wherein the additive is an alkali metal sulfide.

3. A drilling mud as in claim 2 wherein the alkali metal sulfide is potassium sulfide.

4. A drilling mud as in claim 2 wherein the alkali metal sulfide is sodium sulfide.

5. A drilling mud as in claim 1 wherein the additive is an alkali metal polysulfide.

6. A drilling mud as in claim 5 wherein the alkali metal polysulfide is a sodium polysulfide.

7. A drilling mud as in claim 5 wherein the alkali metal polysulfide is a potassium polysulfide.

8. A drilling mud as in claim 1 wherein the additive is an alkali metal hydrosulfite.

9. A drilling mud as in claim 1 to which has been additionally added about 0.1 to 5 pounds of an alkali metal hydroxide per 42 gallon barrel of mud.

10. A drilling mud comprising at least 5% by weight of finely divided solids in an aqueous saline medium to which has been added about 1 to 15 pounds of starch and about 0.1 to 10 pounds of sodium sulfide per 42 gallon barrel of mud.

11. A drilling mud as in claim 10 to which has been additionally added about 0.1 to 5 pounds of sodium hydroxide per 42 gallon barrel of mud.

12. A drilling mud comprising at least 5% by weight of finely divided solids in an aqueous saline medium to which has been added about 1 to 15 pounds of starch and about 0.1 to 10 pounds of sodium hydrosulfite per 42 gallon barrel of mud.

13. A drilling mud as in claim 12 to which has been additionally added about 0.1 to 5 pounds of sodium hydroxide per 42 gallon barrel of mud.

14. In a process for drilling a well with well drilling tools wherein there is circulated in the well a water-based drilling mud containing at least about 5% by weight of finely divided solids, a method of forming a filter cake on the wall of said well to decrease the loss of fluid from said drilling mud contained therein into surrounding earthen formations which comprises admixing with said drilling mud from about 1 to 15 pounds of starch per 42 gallon barrel of mud and from about 0.1 to 10 pounds per 42 gallon barrel of mud of an additive selected from the group consisting of water soluble alkali metal sulfides, polysulfides, and hydrosulfites, said starch and said additive being admixed in amounts sufficient to substantially lower the filtration rate of said mud, and contacting said wall of said well with the thus resulting drilling mud to form said filter cake thereon.

15. A method as in claim 14 wherein the additive is an alkali metal sulfide.

16. A method as in claim 14 wherein the additive is an alkali metal polysulfide.

17. A method as in claim 14 wherein the additive is an alkali metal hydrosulfite.

18. A method as in claim 14 wherein there is also incorporated into the drilling mud an alkali metal hydroxide.

(References on following page)

References Cited in the file of this patent

UNITED STATES PATENTS

| | | |
|---|---|---|
| 1,588,956 | Feldenheimer | June 15, 1926 |
| 2,399,986 | Chapman | May 7, 1946 |
| 2,417,307 | Larsen | May 11, 1947 |

OTHER REFERENCES

Searle: "The Chemistry and Physics of Clays and Other Ceramic Materials," 1924 edition, pages 247 and 249.